United States Patent [19]
Froumajou et al.

[11] 3,794,342
[45] Feb. 26, 1974

[54] AUTOMOBILE VEHICLE

[75] Inventors: Armand Froumajou, Pontoise; Claude Chillon, La Celle, both of France

[73] Assignees: Automobiles Peugeot, Paris; Regie Nationale Des Usines Renault, Billancourt, both of, France

[22] Filed: Dec. 3, 1971

[21] Appl. No.: 204,587

[30] Foreign Application Priority Data
Dec. 16, 1970 France .............................. 70.45367

[52] U.S. Cl. ................ 280/106.5 R, 180/91, 293/63
[51] Int. Cl. ........................ B62d 21/00, B60r 19/04
[58] Field of Search ..... 293/1, 8, 60, 63, 70, 73, 89; 180/92, 93, 94, 95, 91; 188/1 C; 280/106 R, 106.5 R

[56] References Cited
UNITED STATES PATENTS

| | | |
|---|---|---|
| 1,386,242 | 8/1921 | Dixon .................................. 180/92 |
| 3,430,923 | 3/1969 | Giavotto et al. ..................... 188/1 C |
| 2,998,214 | 8/1961 | Peterman ............................ 244/138 |
| 1,990,757 | 2/1935 | Stiles ................................... 296/28 |
| 1,439,209 | 12/1922 | Watson ............................... 188/1 C |
| 1,600,465 | 9/1926 | Gentiloni ............................. 293/70 |
| 3,171,669 | 3/1965 | Barenyl ................................ 180/91 |

Primary Examiner—Gerald M. Forlenza
Assistant Examiner—Robert Saifer
Attorney, Agent, or Firm—Burns, Doane, Swecker & Mathis

[57] ABSTRACT

Vehicle having a passenger compartment constituted by a rigid unit, a relatively more deformable front part and rear part. There is provided in front of each front wheel and/or at the rear of each rear wheel a shoe which is located substantially mid-way of the height of the wheel and substantially in a longitudinal plane containing the wheel. The shoe is designed to deform plastically under the effect of a predetermined violent shock to absorb a part of the energy involved in the shock.

11 Claims, 6 Drawing Figures

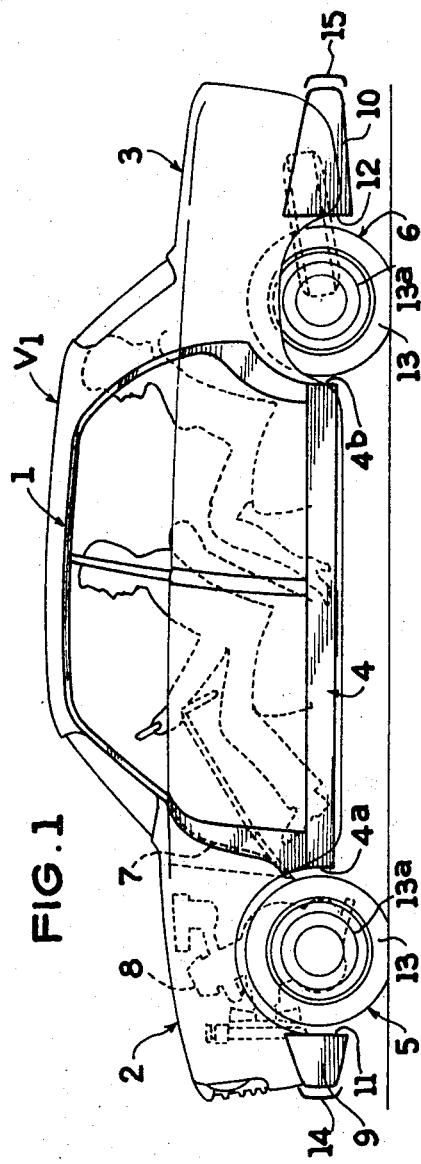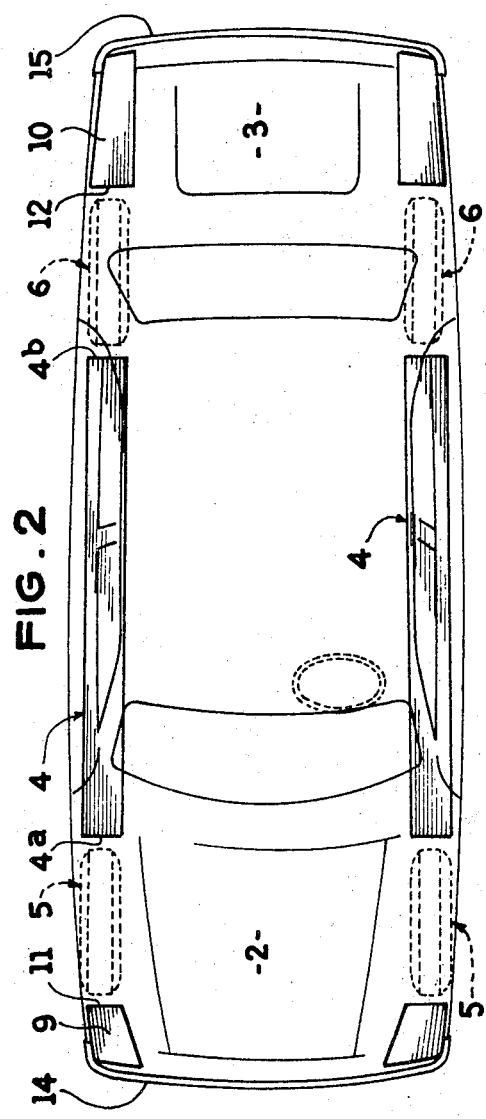

AUTOMOBILE VEHICLE

The present invention relates to automobile vehicles and concerns more particularly the structure or framework of such a vehicle.

It is known that modern vehicles which are more particularly designed to improve the safety of their occupants comprise a compartment constituting a cell or unit which is as rigid and indeformable as possible and front and rear parts which are more easily deformable and are intended to absorb the shocks by absorbing a certain amount of kinetic energy that the vehicle possesses at the moment of impact. It it is desired to produce assemblies which are as simple and as light as possible so as to reduce the weight and the price and improve the performances of the vehicle, said front and rear parts have an excessively low crush resistance and this limits to an exaggerated extent their energy-absorbing capacity. Consequently, when a front shock occurs above a certain speed against a fixed obstacle or another vehicle, the crushing of the front or rear parts is such that assemblies or mechanical elements little likely to become deformed, such as the motor-transmission unit, may penetrate the interior of the central unit and result in serious injury to the occupants.

As a result of the progress achieved in protecting means, such as safety belts and/or inflatable bags placed in front of the occupants, it is possible to allow higher decelerations of the central unit by increasing the shock-absorbing capacity of the front and rear parts and thus limiting their crushing to resonable values. Thus, more complex structures have to be provided comprising elements resisting forces exerted in a longitudinal general direction so as to achieve a connection between the end regions and the compartment. This solution is expensive, makes the vehicle heavier and may result in problems in the positioning of certain parts which are difficult to solve.

A device has also been envisaged which consists of spring strips and two slide blocks placed respectively in front of the front wheels of the vehicle to absorb a front shock. Such an arrangement, apart from the fact that it complicates and renders the vehicle much heavier, increases the overall size and modifies the appearance of the vehicle, affords no improvement in the case of shocks, since it restores the major part of the kinetic energy temporarily stored in the springs, and is liable to project the vehicle in the opposite direction, which of course must be avoided.

An object of the invention is to provide a satisfactory solution to the complex problem of the construction of the front and rear part of the vehicle, these font and rear parts being indeed required to be sufficiently deformable and strong to absorb a large part of the kinetic energy involved at the moment of a shock without, however, some of the elements of these parts, which are particularly rigid, being capable of penetrating the compartment of the vehicle.

The invention provides a vehicle comprising a compartment constituted by a rigid unit and two parts which are disposed respectively in the front and at the rear of the compartment and are relatively more deformable, wherein there is provided in front of each front wheel and/or at the rear of each rear wheel a shoe placed substantially in the plane of and mid-way of the height of the adjacent wheel, each shoe being constructed in such manner as to deform plastically unter the action of a sufficiently violent shock so as to absorb a part of the energy involved in the shock.

According to another feature of the invention, the two shoes located at the same end of the vehicle are interconnected by a rigid transverse member which may be constituted by the vehicle bumper or be independent of the latter.

In such an arrangement the wheels of the vehicle, and more particularly their rims, are employed as elements resisting longitudinal forces so as to act as a buffer between the obstacle and the rigid compartment.

Further features and advantages of the invention will be apparent from the ensuing description with reference to the accompanying drawings.

In the drawings:

FIG. 1 is a diagrammatic side elevational view of a vehicle arranged in accordance with the invention;

FIG. 2 is a top view of the vehicle shown in FIG. 1;

Figure 3:
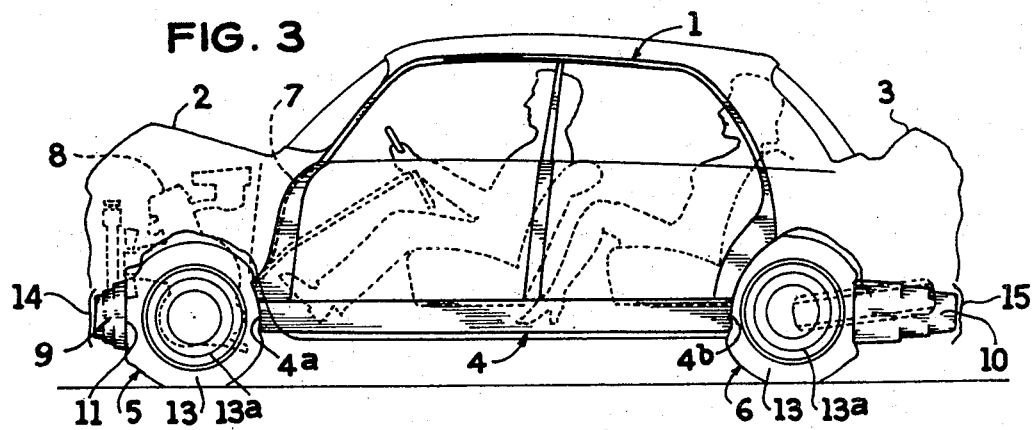
FIG. 3 is a view similar to FIG. 1 of a vehicle which has received a shock from the front and from the rear.

The vehicle $V_1$ shown in FIGS. 1 and 2 comprises a central compartment 1 constituted by a cell or unit which is as rigid as possible and a front part 2 and a rear part 3 which are relatively more deformable. The unit 1 comprises longitudinal elements 4 which are formed at the junction between the floor and each of the side panels of the body and constitute box-structure side members imparting to the compartment high resistance to longitudinal crushing. It will be observed that these side members 4 at the base of the body are located between the front wheels 5 and rear wheels 6, their front and rear faces 4a and 4b being in alignment with these wheels and roughly at the same level as their axes.

The passenger compartment is defined in the front by a bulk head 7 which separates it from the front compartment which is occupied in the presently described embodiment by an engine-transmission unit 8. The rear compartment 3 is a luggage compartment. This arrangement could be of course reversed.

According to the invention, the structure or framework of the vehicle is completed by front and rear reinforcing structures or shoes 9, 10. Each of these shoes is disposed in the plane of the adjacent wheel roughly mid-way of the height of the latter and terminates in a wall 11, 12 which is roughly vertical and disposed at a short distance from the tread of the tire 13 mounted on a rim 13a. These shoes are designed to become crushed by a predetermined force in a permanent and irreversible manner so as to avoid any rebound. This can be achieved by giving to the shoe itself its own resistance to crushing, for example by constructing it in the form of a box structure of relatively thick sheet metal. In this case (FIGS. 1 and 2), the energy is absorbed by the permanent deformation of the sheet metal. In this same embodiment, shown in FIGS. 1 and 2, the shoes 9, 10 are respectively connected in pairs by the bumpers or fenders 14, 15 of the vehicle.

With reference to FIG. 3, it can be seen that in a vehicle designed in this way, when a violent shock occurs at the front and/or at the rear of the vehicle, the shoes 9, 10 bear against the wheels 5, 6 which abut the faces 4a, 4b. In this way, there is no break in the transmission of the forces between the shoes 9, 10 and the rigid unit 1 through the rims 13a.

By suitably choosing the crush resistance of the shoes 9, 10 a large absorption of energy is achieved right at the start of the crushing of the structure without producing a rebound phenomenon.

In this way it is possible:

to limit the crushing to such value that, for example the engine-transmission unit 8 does not push in the bulkhead 7 and there is no danger of splitting open the petrol tank;

to choose with precision the ratio between the force and deformation which would afford the occupants of the vehicle optimum protection.

The structure according to the invention also has considerable advantages in the case of lateral shocks. Indeed, with conventional structures, when a first vehicle collides with the side of a second vehicle, the front end of the first vehicle encounters only the very low resistance opposed by the doors of the second vehicle, so that is penetrates the interior of the second vehicle practically until its front wheels abut the edge of the floor of the second vehicle. Now, in the case of the structure according to the invention, the front shoes are located at the level of the floor of the second vehicle so that the deformation of the lateral or side portion of said second vehicle is considerably reduced.

It should be noted that in the case of the embodiment described hereinbefore, the bumpers can have a higher resistance than that of conventional bumpers so as to transfer the forces exerted on the shoes without folding up excessively under the effect of a localized impact.

Figure 4:
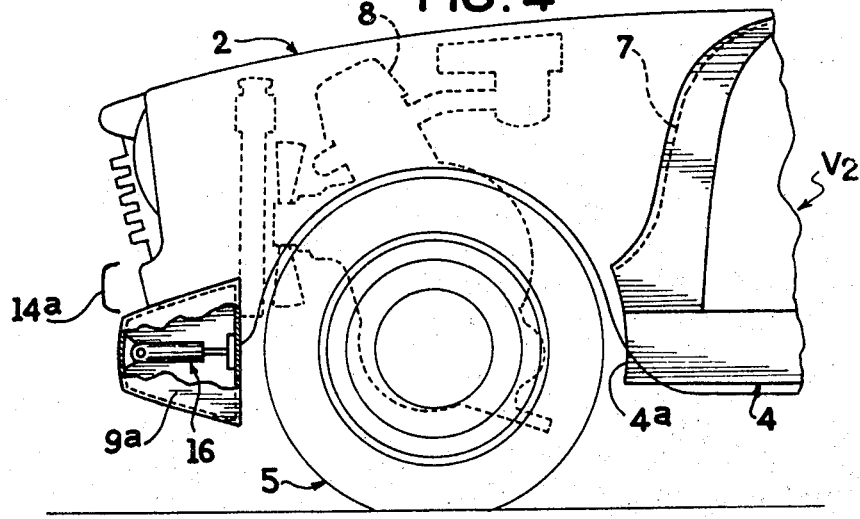
FIG. 4 is a partial view, with a part cut away, of a modification of the invention in which the shoe is provided with an energy absorbing means.

FIG. 4 shows a vehicle $V_2$ which has two modifications with respect to the embodiment shown in FIGS. 1 and 2. First, the shoes 9a are independent from the bumpers or fenders 14a and are for example disposed under the latter and incorporated in the lower part of the wings of the vehicle body. Further, the shoes have been modified in that there is incorporated therein an energy-absorbing means 16 of any known type which is disposed roughly horizontally between the front and rear walls of the shoe. The shoe itself can have relatively low strength and yet be capable of absorbing sufficient kinetic energy upon impact.

Figure 5:
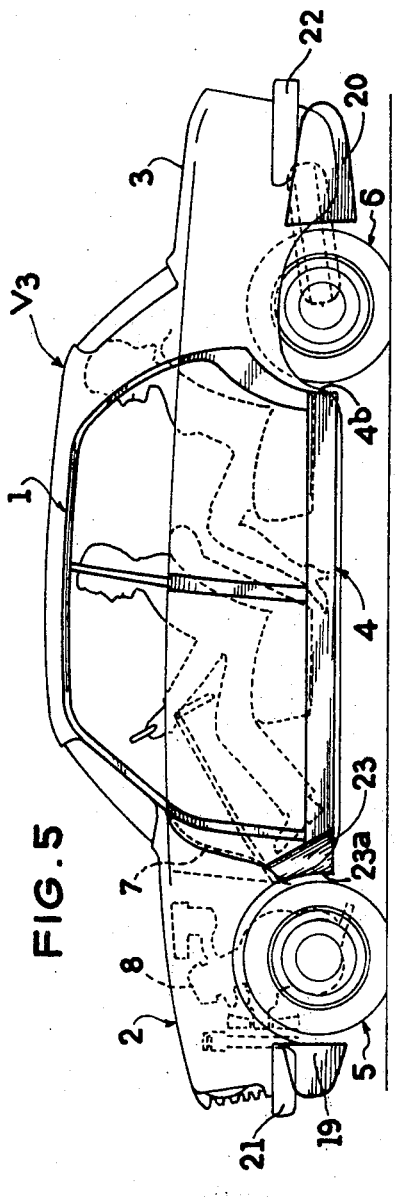
FIGS. 5 and 6 are views identical to FIGS. 1 and 2 of another modification of the invention.
Figure 6:
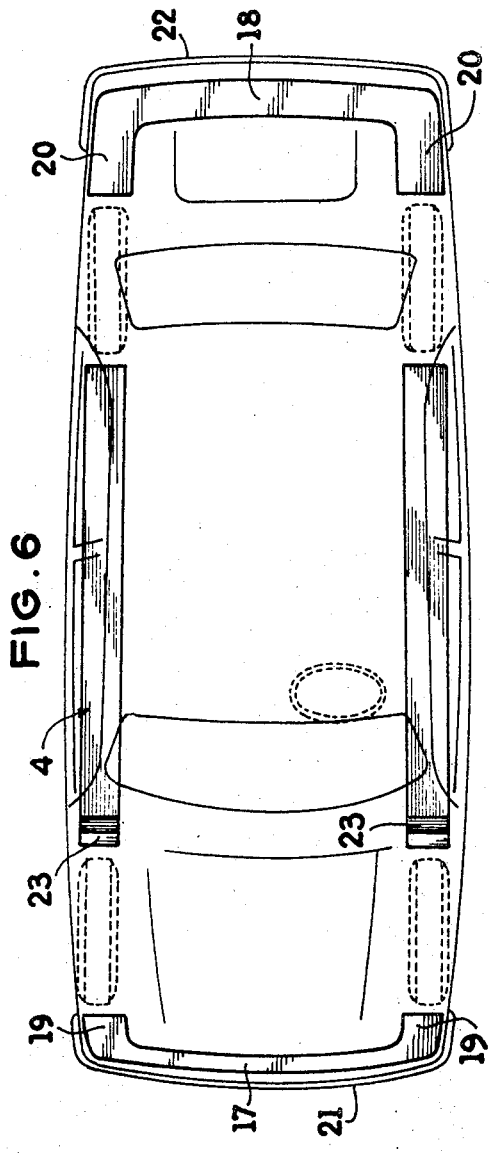

In the modification of the invention shown in FIGS. 5 and 6, transverse elements 17, 18 are provided which carry the front and rear shoes 19, 20 and are separated from the bumpers or fenders 21, 22, the latter being placed if desired at a height different from that of the transverse elements, for example above them and their function being limited to protection against small shocks at low speeds. The presence of such a rigid transverse element enables the forces resulting from a localized impact to be distributed between the shoes and wheels in an improved manner.

Another important feature has been incorporated in the vehicle $V_3$ shown in FIGS. 5 and 6. The rigid unit constituting the passenger compartment is provided in the front of its lateral parts with two additional shoes 23 which also face the wheels and whose function is to complement the energy-absorbing function of the shoes 19. In this way the energy finally transmitted to the passenger compartment can be reduced, which still further increases the safety of passengers.

As in the case of the faces 4a, 4b of the unit which were disposed in the vicinity of the wheels, the faces 23a of the supplementary shoes may be plane or slightly enveloping and are placed as near as possible to the wheels, an allowance being of course made for the clearance which must be provided to allow the mounting and the steering of the wheels and the movements between the suspended parts and unsuspended parts of the vehicle.

Having now described our invention what we claim and desire to secure by Letters Patent is:

1. A vehicle having a front end and a rear end and comprising a front pair of road wheels and a rear pair of road wheels respectively adjacent said front end and said rear end, a passenger compartment constituted by a rigid unit extending substantially between said front and rear pairs of wheels, a front part between said front end and said passenger compartment, a rear vehicle part between said rear end and said passenger compartment, a transverse rigid member extending adjacent one of said ends, a pair of energy absorbing shoes integral with said transverse rigid member and respectively located substantially mid-way of the height of one of said pairs of wheels and substantially in longitudinal alignment with said one pair of wheels and between said one pair of wheels and the adjacent one of said ends of the vehicle, each shoe being capable of deforming plastically under the action of a predetermined violent shock so as to absorb a substantial part of the energy involved in the shock, each shoe being constituted by a sheet metal box structure.

2. A vehicle having a front end and rear end and comprising a front pair of road wheels, a rear pair of road wheels respectively adjacent but spaced from said front end and said rear end, the two front wheels being substantially contained in two vertical longitudinal planes of the vehicle in which planes the two rear wheels are also substantially contained, a vehicle body comprising a rigid cell defining a passenger compartment, two rigid longitudinal members combined with the cell and substantially contained in said two planes and extending between the corresponding front wheel and rear wheel, said longitudinal members having end portions in close proximity to but spaced from the front wheel and rear wheel whereby the wheels are capable of being supported by the rigid longitudinal members longitudinally of the vehicle upon impact on the wheels sufficient to displace the wheels toward the corresponding rigid longitudinal member, said longitudinal members being substantially contained in a third plane containing axes of rotation of the two pairs of wheels, a reinforcing shock-absorbing structure contained substantially in each of said longitudinal planes and substantially in said third plane, each shock-absorbing structure comprising means defining a first surface in close proximity to but spaced from one of said wheels in the corresponding longitudinal plane and means defining a second surface adjacent the corresponding end of the vehicle, each of said shock-absorbing structures being fixed in position relative to said vehicle body and capable of reinforcing the crush resistance of said body in the longitudinal direction but free to undergo a permanent plastic deformation so as to bring the second surface closer to the first surface upon impact on the shock-absorbing structure in a longitudinal direction of high magnitude which is lower than the magnitude of impact that would be required on the end of the vehicle to crush the rigid longitudinal member in the longitudinal plane of the shock-absorbing structure through the medium of the corresponding wheel.

3. A vehicle as claimed in claim 2, wherein each reinforcing structure comprises a wall portion defining said first surface and a wall portion defining said second surface and kinetic energy-absorbing means interposed between and interconnecting the two wall portions.

4. A vehicle having a front end and a rear end and comprising a front pair of road wheels, a rear pair of road wheels respectively adjacent but spaced from said front end and said rear end, the two front wheels being substantially contained in two vertical longitudinal planes of the vehicle in which planes the two rear wheels are also substantially contained, a vehicle body comprising a rigid cell defining a passenger compartment, two rigid longituinal members combined with the cell and substantially contained in said two planes and extending between the corresponding front wheel and rear wheel, said longitudinal members having end portions in close proximity to but spaced from the front wheel and rear wheel whereby the wheels are capable of being supported by the rigid longitudinal members longitudinally of the vehicle upon impact on the wheels sufficient to displace the wheels toward the corresponding rigid longitudinal member, said longitudinal members being substantially contained in a third plane containing axes of rotation of the two pairs of wheels, a reinforcing shock-absorbing structure contained substantially in each of said longitudinal planes and substantially in said third plane, each shock-absorbing structure comprising means defining a first surface in close proximity to but spaced from one of said wheels in the corresponding longitudinal plane and means defining a second surface adjacent the corresponding end of the vehicle, each of said shock-absorbing structures being fixed in position relative to said vehicle body and capable of reinforcing the crush resistance of said body in the longitudinal direction but free to undergo a permanent plastic deformation so as to bring the second surface closer to the first surface upon impact on the shock-absorbing structure in a longitudinal direction of high magnitude which is lower than the magnitude of impact that would be required on the end of the vehicle to crush the rigid longitudinal member in the longitudinal plane of the shock-absorbing structure through the medium of the corresponding wheel, and a rigid member extending transversely of the vehicle adjacent an end of the vehicle and rigidly interconnecting the two shock-absorbing structures, said transverse rigid member being capable of substantially withstanding deformation upon impact on the transverse rigid member which would initiate longitudinal deformation of the shock-absorbing structures.

5. A vehicle as claimed in claim 4, wherein the transverse rigid member constitutes a bumper of the vehicle.

6. A vehicle as claimed in claim 2, wherein the passenger compartment and the longitudinal members have, in the immediate vicinity of each wheel of one of said pairs of wheels corresponding to the shock-absorbing structures, a shape which partially envelops the wheel in said longitudinal planes.

7. A vehicle having a front end and a rear end and comprising a front pair of road wheels, a rear pair of road wheels respectively adjacent but spaced from said front end and said rear end, the two front wheels being substantially contained in two vertical longitudinal planes of the vehicle in which planes the two rear wheels are also substantially contained, a vehicle body comprising a rigid cell defining a passenger compartment, two rigid longitudinal members combined with the cell and substantially contained in said two planes and extending between the corresponding front wheel and rear wheel, said longitudinal members having end portions in close proximity to but spaced from the front wheel and rear wheel whereby the wheels are capable of being supported by the rigid longitudinal members longitudinally of the vehicle upon impact on the wheels sufficient to displace the wheels toward the corresponding rigid longitudinal member, said longitudinal members being substantially contained in a third plane containing axes of rotation of the two pairs of wheels, a pair of reinforcing shock-absorbing structures locacted in front of said front pair of wheels and a pair of reinforcing shock-absorbing structures located at the rear of said rear pair of wheels, each reinforcing shock-absorbing structure being substantially contained in a corresponding one of said longitudinal planes and substantially contained in said third plane and comprising means defining a first surface in close proximity to but spaced from the corresponding wheel in the corresponding longitudinal plane and means defining a second surface adjacent the corresponding end of the vehicle, each of said shock-absorbing structures being fixed in position relative to said vehicle body and capable of reinforcing the crush resistance of said body in the longitudinal direction but free to undergo a permanent plastic deformation so as to bring the second surface closer to the first surface upon impact on the shock-absorbing structure in a longitudinal direction of high magnitude which is lower than the magnitude of impact that would be required on the end of the vehicle to crush the rigid longitudinal member in the longitudinal plane of the shock-absorbing structure through the medium of the corresponding wheel.

8. A vehicle as claimed in claim 7, wherein the passenger compartment and the longitudinal members have, in the immediate vicinity of each wheel of each of said pairs of wheels, a shape which partially envelops the wheel in said longitudinal planes.

9. A vehicle as claimed in claim 2, further comprising in each part of the passenger compartment located in the vicinity of a wheel of one of said pairs of wheels corresponding to the shock-absorbing structures, a supplementary energy absorbing structure capable of deforming plastically and thereby absorb energy under the action of a predetermined violent shock exerted on the supplementary structure by the wheel.

10. A vehicle as claimed in claim 1, wherein said first surface of each shock-absorbing means extends above and below said third plane.

11. A vehicle as claimed in claim 2, wherein each shock-absorbing structure is a box-shaped structure.

* * * * *